(12) United States Patent
Brown et al.

(10) Patent No.: US 11,261,602 B2
(45) Date of Patent: Mar. 1, 2022

(54) FIBER MAT, METHOD OF MAKING THE FIBER MAT, AND BITUMINOUS ROOFING PRODUCT

(71) Applicant: SAINT-GOBAIN ADFORS CANADA, LTD., Grand Island, NY (US)

(72) Inventors: Nancy E. Brown, New Braintree, MA (US); Matthew Gacek, Rutland, MA (US); Tao Yu, Wellesley, MA (US)

(73) Assignee: CRETAINTEED LLC, Malvern, PA (US)

( * ) Notice: Subject to any disclaimer, the term of this patent is extended or adjusted under 35 U.S.C. 154(b) by 0 days.

(21) Appl. No.: 15/851,365

(22) Filed: Dec. 21, 2017

(65) Prior Publication Data

US 2018/0179758 A1 Jun. 28, 2018

Related U.S. Application Data

(60) Provisional application No. 62/437,317, filed on Dec. 21, 2016.

(51) Int. Cl.
*E04B 1/20* (2006.01)
*D06N 5/00* (2006.01)
(Continued)

(52) U.S. Cl.
CPC ............... *E04D 1/20* (2013.01); *B29C 70/12* (2013.01); *D06N 3/0011* (2013.01);
(Continued)

(58) Field of Classification Search
CPC ........ B29C 70/12; B29C 70/52; D06N 5/003; D06N 3/0011; D06N 3/0022;
(Continued)

(56) References Cited

U.S. PATENT DOCUMENTS 3,969,171 A * 7/1976 Bolen ....................... B32B 5/26
156/167
4,219,603 A 8/1980 Thun
(Continued)

FOREIGN PATENT DOCUMENTS

CA 2553162 A1 7/2005
CA 2210768 C 9/2009
(Continued)

OTHER PUBLICATIONS

European Search Report dated Mar. 27, 2019 in corresponding application EP 19 15 0433, 11 pages.
(Continued)

*Primary Examiner* — Camie S Thompson
(74) *Attorney, Agent, or Firm* — Abel Schillinser, LLP; Thomas H. Osborn (57) ABSTRACT

A fiber mat includes a unitary assembly of fibers including at least a first set of fibers and at least a first binder comprising an organic resin, wherein the unitary assembly of fibers includes a minority portion and a majority portion different than the minority portion, wherein the fiber mat provides at least a 5% increase in tear when placed in a bituminous roofing product compared to an equivalent bituminous roofing product made with a fiber mat of equivalent weight containing a homogenous mat structure.

16 Claims, 5 Drawing Sheets

(51) Int. Cl.
*D06N 3/00* (2006.01)
*B29C 70/12* (2006.01)
*D06N 3/10* (2006.01)
*E04D 1/20* (2006.01)

(52) U.S. Cl.
CPC ......... *D06N 3/0022* (2013.01); *D06N 3/0036* (2013.01); *D06N 3/0079* (2013.01); *D06N 3/0095* (2013.01); *D06N 3/10* (2013.01); *D06N 5/003* (2013.01); *D06N 2203/045* (2013.01)

(58) Field of Classification Search
CPC .......... D06N 3/0036; D06N 3/10; E04D 1/20; E04D 1/00; E04D 5/02; E04D 2001/005; D04H 1/64; D04H 1/4218; D04H 1/16; D04H 1/00; D04H 3/08; D04H 13/00; D04H 1/587; D04H 3/12; C04B 20/0068; C04B 20/1044; C04B 2111/00586; C04B 26/127; Y10T 428/249921; Y10T 442/2992; Y10T 442/20; Y10T 442/2967; Y10T 442/673; B32B 5/24; B32B 5/02; B32B 27/12; B32B 5/26
USPC .......... 442/176, 180, 327, 59, 393; 428/221, 428/297.4; 52/518
See application file for complete search history.

(56) References Cited

U.S. PATENT DOCUMENTS

| | | |
|---|---|---|
| 4,491,617 A | 1/1985 | O'Connor et al. |
| 4,780,350 A | 10/1988 | O'Connor et al. |
| 5,017,426 A | 5/1991 | Greiser et al. |
| 5,326,797 A | 7/1994 | Zimmerman et al. |
| 5,571,596 A | 11/1996 | Johnson |
| 5,612,114 A | 3/1997 | Zalewski et al. |
| 5,616,395 A | 4/1997 | Baravian et al. |
| 5,822,943 A | 10/1998 | Frankoshi et al. |
| 5,837,620 A | 11/1998 | Kajander |
| 5,851,933 A | 12/1998 | Swartz et al. |
| 5,865,003 A * | 2/1999 | Klett .............. D06N 5/00 156/62.2 |
| 5,883,024 A | 3/1999 | O'Haver-Smith et al. |
| 6,038,826 A | 3/2000 | Stahl et al. |
| 6,187,697 B1 | 2/2001 | Jaffee et al. |
| 6,341,462 B2 | 1/2002 | Kiik et al. |
| 6,426,309 B1 | 7/2002 | Miller et al. |
| 6,817,152 B2 | 11/2004 | Peng et al. |
| 6,936,329 B2 | 8/2005 | Kiik et al. |
| 7,048,990 B2 | 5/2006 | Koschitzky |
| 7,155,866 B2 | 1/2007 | Bezubic, Jr. et al. |
| 7,285,183 B2 | 10/2007 | Kajander et al. |
| 7,309,668 B2 | 12/2007 | Wilson et al. |
| 7,412,756 B2 | 8/2008 | Droux et al. |
| 7,827,753 B2 | 11/2010 | Nagarajan et al. |
| 7,833,383 B2 | 11/2010 | Wilson et al. |
| 7,887,900 B2 | 2/2011 | DiPede |
| 7,928,023 B2 | 4/2011 | Canfield et al. |
| 7,932,195 B2 | 4/2011 | Smith et al. |
| 7,998,565 B2 | 8/2011 | Mitsuhashi et al. |
| 8,006,457 B2 | 8/2011 | Binkley et al. |
| 8,012,310 B2 | 9/2011 | Wilson et al. |
| 8,025,765 B2 | 9/2011 | Wilson et al. |
| 8,187,418 B2 | 5/2012 | Kajander et al. |
| 9,297,098 B2 | 3/2016 | Stevens et al. |
| 9,359,523 B2 | 6/2016 | Dubois et al. |
| 2002/0037405 A1 | 3/2002 | Naipawer, III et al. |
| 2003/0008586 A1 | 1/2003 | Kajander et al. |
| 2003/0092337 A1 | 5/2003 | Lehnert et al. |
| 2003/0124932 A1 | 7/2003 | Droux |
| 2004/0014385 A1 | 1/2004 | Greaves, Jr. et al. |
| 2004/0144060 A1 | 7/2004 | Becker et al. |
| 2004/0235379 A1 | 11/2004 | Ahluwalia et al. |
| 2005/0202742 A1 | 9/2005 | Smith et al. |
| 2005/0208861 A1 | 9/2005 | Dwiggins et al. |
| 2006/0099870 A1 | 5/2006 | Garcia et al. |
| 2006/0228963 A1 | 10/2006 | Souther et al. |
| 2007/0012414 A1 | 1/2007 | Kajander et al. |
| 2007/0149078 A1 | 6/2007 | Nandi et al. |
| 2007/0231545 A1 | 10/2007 | Ruan |
| 2007/0261337 A1 | 11/2007 | Whitaker et al. |
| 2008/0207833 A1 | 8/2008 | Bear et al. |
| 2009/0075050 A1 | 3/2009 | Adzima et al. |
| 2009/0159228 A1 | 6/2009 | Law et al. |
| 2010/0273376 A1 | 10/2010 | Jaffee et al. |
| 2011/0223384 A1 | 9/2011 | Whitaker et al. |
| 2012/0251597 A1 | 10/2012 | Gupta et al. |
| 2013/0025224 A1 | 1/2013 | Vermillion et al. |
| 2014/0259820 A1 | 9/2014 | Humphreys et al. |
| 2015/0240492 A1 | 8/2015 | Teng et al. |
| 2016/0145779 A1 | 5/2016 | Teng et al. |
| 2016/0177483 A1 | 6/2016 | Pesquet et al. |
| 2018/0179758 A1 | 6/2018 | Brown et al. |

FOREIGN PATENT DOCUMENTS

| | | |
|---|---|---|
| CA | 2772882 A1 | 10/2012 |
| CA | 2858588 A1 | 2/2015 |
| CN | 2475750 Y | 2/2002 |
| CN | 1367851 A | 9/2002 |
| CN | 1307340 C | 3/2007 |
| CN | 100491664 C | 5/2009 |
| CN | 103711261 A | 5/2014 |
| CN | 103802380 A | 5/2014 |
| CN | 204590426 U | 8/2015 |
| CN | 103821282 B | 1/2017 |
| DE | 10111868 A1 | 10/2002 |
| EP | 1447212 A1 | 8/2004 |
| EP | 1746209 A2 | 1/2007 |
| KR | 101328538 B1 | 11/2013 |
| KR | 20140110087 A | 9/2014 |
| WO | 0108882 A2 | 2/2001 |
| WO | 2012065084 A2 | 5/2002 |
| WO | 2012065903 A1 | 5/2012 |
| WO | 2018119297 A1 | 6/2018 |

OTHER PUBLICATIONS

International Search Report & Written Opinion for PCT/US2017/068000, dated Apr. 17, 2018, 15 pages.

* cited by examiner

FIBER MAT, METHOD OF MAKING THE FIBER MAT, AND BITUMINOUS ROOFING PRODUCT

CROSS-REFERENCE TO RELATED APPLICATION(S)

This application claims priority under 35 U.S.C. § 119(e) to U.S. Patent Application No. 62/437,317, entitled "A FIBER MAT, METHOD OF MAKING THE FIBER MAT, AND BITUMINOUS ROOFING PRODUCT," by Nancy E. BROWN et al., filed Dec. 21, 2016, which is assigned to the current assignee hereof and incorporated herein by reference in its entirety.

FIELD OF THE DISCLOSURE

The present disclosure relates to a fiber mat and in particular, a fiber mat for construction products.

BACKGROUND

Building materials for construction, such as roofing shingles, gypsum wall boards, cement boards, and tiles, are typically constructed with a fiber mat. Chopped strand mat, suitable for use in construction materials, generally includes glass fibers because they are of high strength and tend not to shrink during use. The glass fibers are typically formed by attenuating streams of molten glass material from a bushing. The fibers are drawn from the bushing and the fibers are then chopped directly into a container. The chopped fibers are then dispersed in a water slurry which contains surfactants, viscosity modifiers, dispersants and other chemical agents. The fibers and slurry are agitated to disperse the fibers prior to depositing the mixture onto a moving screen where most of the water is removed. Although this generally describes a wet-laid process, a dry-laid process may be used. A polymeric binder is then applied. After application of the polymeric binder, the resulting mat is heated to remove the remaining water and cure the binder.

Important properties for a fiber mat include caliper, tensile strength, and tear strength. These properties are useful in determining the efficacy of the manufacture of fiber mat products and final properties of the fiber mat. Unfortunately, as tensile strength of the fiber mat increases, the tear strength of a bituminous roofing product containing the fiber mat typically decreases. As such, modifications to the fiber mats to improve tear strength while maintaining tensile strength are desired.

Accordingly, a need continues to exist in the art for improved fiber mats.

SUMMARY

In an embodiment, a fiber mat includes a unitary assembly of fibers including at least a first set of fibers and at least a first binder comprising an organic resin, wherein the unitary assembly of fibers includes a minority portion and a majority portion different than the minority portion, wherein the fiber mat provides at least a 5% increase in tear when placed in a bituminous roofing product compared to an equivalent bituminous roofing product made with a fiber mat of equivalent weight containing a homogenous mat structure.

In another embodiment, a method of making a fiber mat includes providing a unitary assembly of fibers including at least a first set of fibers; applying at least a first binder to the unitary assembly of fibers, wherein the at least first binder includes an organic resin; and curing the at least first binder, wherein the unitary assembly of fibers includes a minority portion and a majority portion different than the minority portion, wherein the fiber mat provides at least a 5% increase in tear when placed in a bituminous roofing product compared to an equivalent bituminous roofing product made with a fiber mat of equivalent weight containing a homogenous mat structure.

In yet another embodiment, a bituminous roofing product includes a fiber mat including a unitary assembly of fibers including at least a first set of fibers; and at least a first binder including an organic resin, wherein the unitary assembly of fibers includes a minority portion and a majority portion different than the minority portion, wherein the fiber mat provides at least a 5% increase in tear when placed in a bituminous roofing product compared to an equivalent bituminous roofing product when made with a fiber mat of equivalent weight containing a homogenous mat structure; and at least one coating of asphalt.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises", "comprising", "includes", "including", "has", "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

In an embodiment, the present invention provides a fiber mat. The fiber mat includes a unitary assembly of fibers including at least a first set of fibers and at least a first binder including an organic resin. The unitary assembly of fibers includes a minority portion and a majority portion that is different than the minority portion. Advantageously, the fiber mat provides at least a 5% increase in tear when used in a bituminous roofing product, compared to an equivalent bituminous roofing product made with a fiber mat of equivalent weight containing a homogenous mat structure. "A homogenous mat structure" as used herein refers to a fiber mat that is homogenous in binder, fiber, composition, and the like throughout the entirety of the mat. A "bituminous roofing product" as used herein includes the fiber mat and at least one coating of asphalt.

The "unitary assembly of fibers" as discussed herein refers to an assembly of fibers that are integrally intertwined through an entire thickness from a top surface of the fiber mat to a bottom surface of the fiber mat. Further, the unitary assembly of fibers includes the minority portion and the majority portion. In particular, there is fiber entanglement between the minority portion and the majority portion. Although the assembly or fibers are integrally intertwined, the minority portion is different than the majority portion. "A minority portion" refers to a portion of the fiber mat that is less than 50% of the total composition of fiber mat. "A majority portion" percentage refers to a portion of the fiber mat that is greater than 50% of the total composition of the fiber mat. In particular, a "unitary assembly of fibers" excludes an assembly of fibers that are laminated or separately joined.

In an embodiment, the minority portion and the majority portion each provides advantageous properties. The minority portion and the majority portion can be configured to custom tailor the fiber mat and its properties. In particular, each portion provides different properties to the final mat as well as the final product, such as a bituminous roofing product. For instance, the minority portion provides a higher tensile strength than a tensile strength of the majority portion. Further, when the fiber mat is used in a bituminous roofing product, the majority portion of the fiber mat provides the increase in tear strength of the bituminous roofing product when compared to the minority portion of the fiber mat. The properties of tear strength and tensile strength are typically coupled inversely with a homogenous mat structure. Although not being bound by theory, by forming a fiber mat with a minority portion that is different than a majority portion, the properties of tear strength and tensile strength can be selectively decoupled to tailor and achieve both desirable tear strength and tensile strength, particularly when the fiber mat is used in a bituminous roofing product.

In an embodiment, the minority portion may be any portion of the fiber mat. In a particular embodiment, the minority portion is a plane parallel to a plane of the assembly of fibers portion of the unitary assembly of fibers. Any position of the minority portion within the fiber mat is envisioned. For instance, the minority portion is closer in distance to a top surface of the fiber mat compared to a bottom surface of the fiber mat. When the minority portion is closer to one surface of the fiber mat, the fiber mat has asymmetrical flexibility. In an embodiment, the minority portion is sandwiched between the majority portion. In an example, the minority portion is approximately equidistant from the top surface of the fiber mat and the bottom surface of the fiber mat, such as in the middle of the fiber mat. When the minority portion is in the middle of the fiber mat, the fiber mat has symmetrical flexibility.

The minority portion is different than the majority portion by any reasonable means envisioned. For instance, the minority portion may be different than the majority portion with a difference in fibers, a difference in binder, or combination thereof. For instance, the minority portion includes a first set of fibers and the majority portion includes a second set of fibers, the first set of the fibers being different than the second set of fibers. Any configuration of providing different fibers is envisioned. For instance, the first set of fibers may be different from the second set of fibers in length, diameter, composition, amount, or any combination thereof.

In a particular embodiment, the unitary assembly of fibers includes a first set of fibers that can be any length such as continuous strand, chopped, or combination thereof. In a more particular embodiment, the first set of fibers is chopped into a suitable length to provide randomly disposed fibers. Any reasonable length of fibers is envisioned. Generally, the first set of fibers has a length of about 0.5 inches to about 3 inches. In an embodiment, any reasonable diameter of the fibers is envisioned. For instance, a diameter of at least about 3 microns, such as about 3 microns to about 30 microns, such as about 3 microns to 20 microns, such as at least about 11 microns, such as about 13 microns, or even 16 microns are used. In a particular embodiment, the first set of fibers has a diameter of about 11 microns to about 16 microns. Each assembly may contain any reasonable amount of fibers. The first set of fibers can have a composition that includes a variety of suitable materials. For instance, the first set of fibers can include a glass fiber, such as a fiber made from A-type glass fiber, a C-type glass fiber, an E-type glass fiber, an S-type glass fiber, an E-CR-type glass fiber, a wool glass fiber, a polymer fiber, a natural fiber such as a basalt fiber, or a combination thereof. In a particular embodiment, the first set of fibers are glass fiber.

When the minority portion is different than the majority portion by varying the fibers, the second set of fibers can be any of the fibers described for the first set of fibers, with the proviso that the first set of fibers is different than the second set of fibers. Any suitable configuration of the unitary assembly of fibers is envisioned. In an embodiment, the unitary assembly of fibers may be a non-woven mat.

In an embodiment, the minority portion is different than the majority portion by varying the binder. For instance, the binder may be varied in composition, concentration, or combination thereof. Any amount of binder on the minority portion and the majority portion is envisioned. In an embodiment, the binder concentration in the minority portion is different than the majority portion. In a particular embodiment, the concentration of binder in the minority portion is higher than the concentration of binder in the majority portion. When the concentration of binder is different in the minority portion, the binder in the majority portion may or may not be the same as the binder in the minority portion. In an embodiment, the amount of binder in the minority portion is at least two times greater than the amount of binder in the majority portion. In another example, the minority portion includes a first binder and the majority portion includes a second binder, wherein the first binder is different than the second binder.

The fiber mat includes at least a first binder. The first binder is a composition that includes any suitable organic resin. The organic resin can include one or more suitable monomers, oligomers, polymers, copolymers, a suitable blend, or combination thereof. In a particular embodiment, the organic resin is any reasonable resin envisioned for glass mat applications. In an embodiment, the organic resin includes one or several of a urea-formaldehyde composition, a latex composition, an acrylic composition, a styrene-butadiene rubber (SBR) composition, a vinyl acetate ethylene composition, a blend or combination thereof. In a particular embodiment, the organic resin includes a urea-formaldehyde composition, a latex composition, or combination thereof. In an embodiment, the latex is present at an amount of up to about 5% by weight, such as up to about 7% by weight, or even up to about 100% by weight, based on the total weight % of the first binder composition. In an embodiment, the organic resin may be a photocurable polymer. Further, any form of the binder may be envisioned such as a liquid, a powder, or any combination thereof.

The composition of the first binder may also contain a variety of other known additives such as an adhesion promoter to enhance the adhesion of the first binder to the glass mat to increase the bonding strength between the assembly of fibers, a silica colloid to enhance fire resistance, antifoamers, biocides, pigments, the like, or combinations thereof. In an embodiment, the first binder can include less than about 25% by weight of additives, based on the total weight of the first binder composition. In another embodiment, the first binder is substantially free of additives. "Substantially free" as used herein refers to less than about 1% by weight of additives, less than about 0.5% by weight of additives, or even less than about 0.1% by weight of additives, based on the total weight of the first binder composition.

When the minority portion is different than the majority portion by varying the binder composition, the second binder can be the composition as described for the first binder, with the proviso that the first binder is different than the second binder. In an embodiment, the second binder includes a latex present at an amount of up to about 5% by weight, such as up to about 7% by weight, or even up to about 100% by weight, based on the total weight % of the second binder composition.

Any method of providing the fiber mat of the present invention is envisioned and depends upon the final properties desired for the mat. An exemplary method of forming a fiber mat in accordance with the present invention begins with an assembly of fibers, such as chopped bundles of fibers of suitable length. An exemplary method of making the fibers mat includes providing the assembly of fibers. Typically, the assembly of fibers is added to a dispersant medium to form an aqueous slurry, known in the art as "white water". The white water typically contains fibers, dispersant(s), viscosity modifier(s), foam control and biocide additives. The fibrous slurry is then agitated to form a workable, uniform dispersion of fibers having a suitable consistency. The dispersant may contain polyacrylamide, hydroxyethyl cellulose, and other additive such as surfactants, lubricants, defoamers, the like, or combinations thereof.

Although primarily described as a unitary assembly of fibers including at least a first set of fibers, any number of sets of fibers are envisioned. For instance, when the fiber mat is provided with a first set of fibers that is different than a second set of fibers, the first set of fibers and second set of fibers may be provided by any reasonable means or sequence. For instance, a first set of fibers may be provided with a second set of fibers provided over the first set of fibers. In an embodiment, a second set of fiber is sandwiched between a first set of fibers. Any method of providing a first set of fibers and a second set of fibers is envisioned, with the proviso that at least a portion of the first set of fibers and the second set of fibers are integrally intertwined.

The unitary assembly of fibers and white water dispersion is then passed onto a mat-forming machine containing a mat forming screen. The dispersion is usually diluted with water to a lower fiber concentration prior to being dispersed on a screen. The fibers are collected at the screen in the form of a wet fiber mat, and the excess water is removed by gravity or, more preferably, by vacuum in a conventional manner, such as by vacuum boxes. Although this generally describes a wet-laid process, a dry-laid process may also be envisioned. For instance, with a dry-laid process, fibers may be spun from a bushing directly onto a moving web. The binder is subsequently applied.

The binder includes at least a first binder used to fixedly bond the assembly of fibers. Any method of providing the first binder is envisioned. The first binder is traditionally applied to the gravity- or vacuum-assisted de-watered white glass mat. Applying the first binder includes at least one application of the binder on the unitary assembly of fibers. Application of the first binder may be accomplished by any conventional means, such as by soaking the mat in an excess of binder solution, or by coating the mat surface by means of a binder applicator such as a sprayer, roll, or curtain. Other methods include, for example, applying as a film, a slot die, or any reasonable extrusion method. The components of the first binder may be applied separately or mixed together by any method envisioned. For instance, if applied separately, the components of the first binder may be added by the same or a different method. In an embodiment, any other sequence of adding the components of the first binder is envisioned. The total concentration of components in the first binder in an aqueous solution can vary widely in accordance with the practice of the present invention. Any amount of the total binder is envisioned but it will usually be found convenient and satisfactory to make up the total binder in the range from about 5% by weight to about 50% by weight, such as about 10% by weight to about 40% by weight, such as about 10% by weight to about 30% by weight of the cured glass mat.

Following application of the binder, the glass fiber mat is de-watered by any reasonable means, such as under vacuum, to remove excess binder solution. In an embodiment, the mat is dried prior to cure. Any method of drying the glass mat is envisioned. In a particular embodiment, the drying is at a temperature wherein the glass mat does not reach the cure temperature of the binder and is dependent upon the binder composition chosen. For instance, drying is with forced heated air, such as a convection oven, a gas fired oven, an infrared heater, a heated drum, a belt laminator, photoinitiation, ultraviolet (UV) initiation, or combination thereof. In an exemplary embodiment, at least about 95%, such as at least about 90%, or even at least about 80% of water weight of the aqueous binder is removed during the drying process. In an embodiment, the binder is partially cured during the drying step, with a cure of not greater than a 50%, as measured by a ratio of dry tensile strength to tensile strength of a wet glass mat subjected to 10 minutes exposure to 80° C. hot water.

Although primarily described as a first binder, any number of binder compositions, applications of binder, or combination thereof is envisioned. If there is more than one application of the first binder, any subsequent applications of binder may be, for example, the first binder or the second binder. In an embodiment, when the fiber mat is provided with a first binder that is different than the second binder, the first binder and the second binder may be provided in any reasonable means. Any sequence of providing and curing the first binder and the second binder is envisioned. For instance, the first binder is applied prior to the application of the second binder. In yet another embodiment, the second binder is applied prior to the first binder. In an embodiment, a second binder is sandwiched between a first binder. In an embodiment, the first binder may be applied and substantially cured prior to the application of the second binder. In another embodiment, the second binder may be applied and substantially cured prior to the application of the first binder. In another embodiment, the first binder and the second binder may be cured during the same process.

In an embodiment, the cure of the first binder and, when present, the second binder is facilitated with heat provided by any reasonable means. Any heat source is envisioned and includes, for example, oven, infrared heating, heating with a metal plate in contact with the fiber mat, and the like. Any reasonable time and temperatures is envisioned and is dependent upon the binder composition and the desired process speed. In an embodiment, heat treatment is sufficient to effect curing. In an embodiment, catalytic curing may also be used. In an embodiment, dimensional constraint may be applied to the fiber mat during cure. Although cure is primarily described as via a heat treatment, any other method is reasonable, such as, for example, ultraviolet cure. Although an exemplary method is described, any sequence of providing any fiber and any binder is envisioned, depending on the composition of the minority portion, the composition of the majority portion, and the final properties desired for the fiber mat.

Typically, the fiber mat can have any caliper desired. In an example, the caliper at 1.8 pounds (lbs) per 100 square feet is at least about 5 mil, such as about 5 mil to about 200 mil, such as about 10 mil to about 75 mil, such as about 10 mil to about 40 mil, such as about 10 mil to about 30 mil, such as about 10 mil to about 25 mil. In an example, the caliper of the fiber mat is not greater than about 200 mil, such as not greater than about 100 mil, such as not greater than 50 mil.

Figure 1:
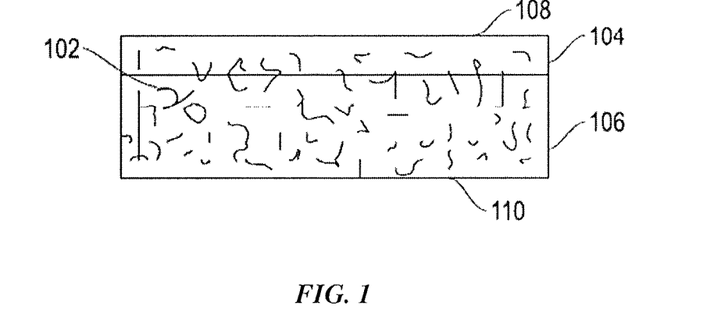
FIG. 1 includes a cross-sectional view of an exemplary fiber mat.

Turning to FIG. 1, a cross-sectional view of a portion of a fiber mat 100 is illustrated. The fiber mat 100 includes a unitary assembly of fibers 102 where the unitary assembly of fibers 102 includes a binder thereon (not shown). The minority portion 104 is of the unitary assembly of fibers 102 less than the majority portion 106. As seen in FIG. 1, there is fiber entanglement between the minority portion 104 and the majority portion 106. Notably, whether the difference of the minority portion 104 and the majority portion 106 is via fiber, binder, or combination thereof, the gradient difference between the minority portion 104 and the majority portion 106 is relatively steep and for an asymmetrically located minority portion this will be reflected by a large flexural stiffness difference between the two sides of the glass mat. Further and as seen in FIG. 1, the minority portion 104 is a plane parallel to the plane of the assembly of fibers portion of the unitary assembly of fibers 102. Additionally, although the minority portion 104 is illustrated as closer to a top surface 108 than a bottom surface 110 of the fiber mat 100, any position of the minority portion 104 is envisioned is dependent upon the final properties desired for the fiber mat 100.

The fiber mat as described has advantageous and unexpected properties. The fiber mat of the present invention has desirable properties such as tensile strength and coefficient of friction. For instance, the fiber mat has a tensile strength at least 80% of a value of tensile strength of a fiber mat of equivalent weight containing a homogenous mat structure. Further, the fiber mat has a tensile strength at least 80% of a value of tensile strength of a higher caliper fiber mat having a homogenous mat structure. In an embodiment, the fiber mat has desirable tensile strength, such as a dry tensile strength of about 50 N/inch to about 400 N/inch, such as about 100 N/inch to about 400 N/inch, or even about 100 N/inch to about 200 N/inch. In an embodiment, the fiber mat has a desirable coefficient of friction. For instance, kinetic coefficient of friction of at least one surface of the fiber mat is greater than 0.4, such as about 0.4 to about 1.0, or even greater than 0.6, such as about 0.6 to about 1.0. Further, the ratio of one surface of the fiber mat to an opposite surface of the fiber mat (for example, bottom-bottom:top-top wherein the minority portion is on a top surface with a greater amount of binder and the majority portion is on a bottom surface with a smaller amount of binder) is at least 1.5, such as 1.5 to 4, or at least 2.5, such as 2.5 to 4. The kinetic coefficient of friction is further discussed in the Examples.

The fiber mat of the present invention has desirable properties such as tear strength, particularly when the fiber mat is used in a bituminous roofing product. As stated earlier, the fiber mat provides at least a 5% increase in tear strength, such as at least a 10% increase in tear strength, such as at least a 15% increase in tear strength, or even at least a 20% increase in tear strength, when placed in a bituminous roofing product compared to an equivalent bituminous roofing product made with a fiber mat of equivalent weight containing a homogenous mat structure. Further, a bituminous roofing product including the fiber mat has a tear strength at least 80% of a value of tear strength an equivalent bituminous roofing product comprising a higher caliper glass mat having a homogenous mat structure. In an embodiment, a bituminous roofing product containing the fiber mat has desirable tear strength, such as a tear strength of about 1200 grams to about 3000 grams, such as about 1600 grams to about 2600 grams, or even about 2000 grams to about 2600 grams for a representative shingle weight of approximately 4,650 g/m² (i.e. 95 lbs/100 ft²) containing a glass mat of approximately 100 g/m² (i.e. 2 lbs/100 ft²). In a more particular embodiment, the fiber mat of the present invention achieves both desirable tensile strength and tear strength, particularly when used in a bituminous roofing product.

The fiber mat as described above can be provided in any suitable manner to provide for a construction product. Any construction product is envisioned where tensile strength, tear strength, air and liquid permeability, flexural strength, conformability, surface roughness, flatness, etcetera are desired. An exemplary construction product includes, for example, a bituminous roofing product, a gypsum wall board, a cement board, a PVC flooring, a rug backing, a tile backing, an insulation facer, a foam facer, a ceiling tile, etcetera, and the like. In an embodiment, the fiber mat can also be used as, composite gypsum building panels, gypsum fiber building panels, cement board, fibrous cement boards, gypsum fiber siding, fibrous cement siding, cement siding, gypsum cove or cornice, fibrous gypsum cove and cornice, cement cove and cornice, fibrous cove and cornice, magnesium oxide building boards, magnesium oxide cove and cornice, magnesium oxide siding, magnesium oxide shingles, asphalt impregnated shingles, asphalt coated shingles, asphalt impregnated building wraps, organic polymer coated, inorganic coated building wraps, organic/inorganic blended coated building wraps, composite siding, tapes incorporating continuous or non-continuous or blended continuous and non-continuous (mats, scrims, tissues, fabrics) materials, corner bead, carpet, reinforced plywood, reinforced layered polymer composites, and reinforced molded or extruded organic or inorganic or blended organic and inorganic materials (including reinforced geometrical substrates, reinforced rigid or flexible plastic tubing, and reinforced cylinders).

In an embodiment, the construction product is a bituminous roofing product. The fiber mat can be provided in the cementitious product to provide structural integrity to the resulting bituminous roofing product. The fiber mat may be situated in any suitable configuration within the bituminous roofing product. In a typical embodiment, the glass mat is coated with at least one layer of asphalt. For example, the fiber mat can be produced as described above and then coated with at least one layer of asphalt. In an embodiment, the fiber mat is coated with at least one layer of asphalt on both the top surface and the bottom surface. Alternatively, the fiber mat can be produced simultaneously or concurrently while it is being coupled to a bituminous roofing product. In an embodiment, at least a portion of the fiber mat can be embedded to any suitable depth from a surface or edge of the bituminous roofing product. In an embodiment, the asphalt substantially impregnates a plurality of interstices between the assembly of fibers. In a particular embodiment, the bituminous roofing product is a roofing shingle. In an embodiment, the bituminous roofing product has a weight of about 175 pounds/100 square feet to about 250 pounds/100 square feet, such as about 190 pound/100 square feet to about 250 pounds/100 square feet, such as about 200 pounds/100 square feet to about 250 pounds/100 square feet.

In a further embodiment, the fiber mat may be coated with a polymer film coating. Any reasonable polymer film coating is envisioned. Typically, the polymer film coating chosen is dependent upon the final properties desired for the construction product. In an embodiment, the polymer film coating includes a latex, an ethylene methyl acrylate, ethylene vinyl acetate, polyethylene terephthalate, polyamide, hot melt adhesive, fluoropolymer, polyolefin, or combination thereof. The method of applying the polymer film coating is dependent upon the material. Any method is envisioned such as coating, extruding, spraying, or laminating. For instance, a polymer film coating may be extruded directly onto the fiber mat without any intervening layers. In another embodiment, a polymer film coating may be laminated, with or without an adhesive, onto the fiber mat.

In an example, the polymer film coating can be provided on the fiber mat and can be positioned on any portion of the fiber mat desired. In an embodiment, the polymer film coating can partially or substantially coat at least one surface the fiber mat. In an embodiment, the polymer film coating can partially coat at least two surfaces of the fiber mat. In a particular embodiment, the polymer film coating can substantially coat the fiber mat and can penetrate the fiber mat. The polymer film coating can also include more than one layer on the fiber mat, each of which can be allowed to set, harden, dry, or otherwise cure before any additional layers of polymer film coating are applied. The polymer film coating can include any suitable thickness such as at least about 5 microns, or range of thicknesses, such as between about 5 microns and about 300 microns.

Any one or more suitable components are envisioned for the fiber mat depending upon the final product and properties desired. In an embodiment, the fiber mat can include one component such as a nonwoven laid scrim. In another embodiment, the fiber mat can include more than one component, such as one or more scrims, either woven or nonwoven, suitably coupled to one or more mats, either woven or nonwoven. For example, a woven scrim including glass fibers can be coupled to the nonwoven mat.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

A fiber mat includes a unitary assembly of fibers including at least a first set of fibers and at least a first binder including an organic resin, wherein the unitary assembly of fibers includes a minority portion and a majority portion different than the minority portion, wherein the fiber mat provides at least a 5% increase in tear when placed in a bituminous roofing product compared to an equivalent bituminous roofing product made with a fiber mat of equivalent weight containing a homogenous mat structure.

Embodiment 2

A method of making a fiber mat includes providing a unitary assembly of fibers including at least a first set of fibers; applying at least a first binder to the unitary assembly of fibers, wherein the at least first binder includes an organic resin; and curing the at least first binder, wherein the unitary assembly of fibers includes a minority portion and a majority portion different than the minority portion, wherein the fiber mat provides at least a 5% increase in tear when placed in a bituminous roofing product compared to an equivalent bituminous roofing product made with a fiber mat of equivalent weight containing a homogenous mat structure.

Embodiment 3

A bituminous roofing product includes a fiber mat including a unitary assembly of fibers including at least a first set of fibers; and at least a first binder including an organic resin, wherein the unitary assembly of fibers includes a minority portion and a majority portion different than the minority portion, wherein the fiber mat provides at least a 5% increase in tear when placed in a bituminous roofing product compared to an equivalent bituminous roofing product when made with a fiber mat of equivalent weight containing a homogenous mat structure; and at least one coating of asphalt.

Embodiment 4

The fiber mat, the method, or the bituminous roofing product of any of the preceding embodiments, wherein the minority portion has a higher tensile strength than a tensile strength of the majority portion.

Embodiment 5

The fiber mat, the method, or the bituminous roofing product of any of the preceding embodiments, wherein the majority portion, when placed in a bituminous roofing product, provides the increase in tear when compared to the minority portion.

Embodiment 6

The fiber mat, the method, or the bituminous roofing product of any of the preceding embodiments, wherein the minority portion is a plane parallel to the plane of the assembly of fibers portion of the unitary assembly of fibers.

Embodiment 7

The fiber mat, the method, or the bituminous roofing product of embodiment 6, wherein the minority portion is closer in distance to a top surface of the fiber mat compared to a bottom surface of the fiber mat.

Embodiment 8

The fiber mat, the method, or the bituminous roofing product of embodiment 7, wherein the fiber mat has an asymmetric flexibility.

Embodiment 9

The fiber mat, the method or the bituminous roofing product of embodiment 6, wherein the minority portion is approximately equidistant from a top surface of the fiber mat and a bottom surface of the fiber mat.

Embodiment 10

The fiber mat, the method, or the bituminous roofing product of any of the preceding embodiments, wherein the minority portion includes the first set of fibers and the majority portion includes a second set of fibers, wherein the first set of fibers is different than the second set of fibers.

Embodiment 11

The fiber mat, the method, or the bituminous roofing product of embodiment 10, wherein the first set of fibers are different than the second set of fibers in length, diameter, composition, amount, or combination thereof.

Embodiment 12

The fiber mat, the method, or the bituminous roofing product of any of the preceding embodiments, wherein the first set of fibers includes glass fiber, polymer fibers, basalt fibers, or combination thereof.

Embodiment 13

The fiber mat, the method, or the bituminous roofing product of embodiment 12, wherein the glass fibers include an A-type glass fiber, a C-type glass fiber, an E-type glass fiber, an S-type glass fiber, an E-CR-type glass fiber, a wool glass fiber, or a combination thereof.

Embodiment 14

The fiber mat, the method, or the bituminous roofing product of any of the preceding embodiments, wherein the minority portion includes a higher concentration of the first binder than the amount of a binder on the majority portion.

Embodiment 15

The fiber mat, the method, or the bituminous roofing product of embodiment 14, wherein the first binder in the minority portion is present at an amount of greater than twice the amount of the binder in the majority portion.

Embodiment 16

The fiber mat, the method, or the bituminous roofing product of embodiment 14, wherein a ratio of a coefficient of friction of a bottom-bottom to a top-top of the fiber mat is greater than 1.25.

Embodiment 17

The fiber mat, the method, or the bituminous roofing product of any of the preceding embodiments, wherein the organic resin includes a urea-formaldehyde composition, a latex composition, a styrene-butadiene rubber (SBR) composition, a vinyl acetate ethylene composition, a blend or combination thereof.

Embodiment 18

The fiber mat, the method, or the bituminous roofing product of any of the preceding embodiments, wherein the minority portion includes the first binder and the majority portion includes a second binder, wherein the first binder is different than the second binder.

Embodiment 19

The fiber mat, the method, or the bituminous roofing product of embodiment 18, wherein the second binder including an organic resin comprising a urea-formaldehyde composition, a latex composition, a styrene-butadiene rubber (SBR) composition, a vinyl acetate ethylene composition, a blend or combination thereof.

Embodiment 20

The fiber mat, the method, or the bituminous roofing product of embodiment 19, wherein the second binder includes a latex present at an amount of up to about 5% by weight, such as up to about 7% by weight, or even up to about 100% by weight, based on the total weight % of the second binder composition.

Embodiment 21

The fiber mat, the method, or the bituminous roofing product of any of the preceding embodiments, wherein the fiber mat has a tensile strength at least 80% of a value of tensile strength of a fiber mat of equivalent weight containing a homogenous mat structure.

Embodiment 22

The fiber mat, the method, or the bituminous roofing product of any of the preceding embodiments, wherein the fiber mat has a tensile strength at least 80% of a value of tensile strength of a higher caliper fiber mat having a homogenous mat structure.

Embodiment 23

The fiber mat, the method, or the bituminous roofing product of any of the preceding embodiments, wherein a bituminous roofing product including the fiber mat has a tear strength at least 80% of a value of tear strength of an equivalent bituminous roofing product including a higher caliper glass mat having a homogenous mat structure.

Embodiment 24

The fiber mat, the method, or the bituminous roofing product of any of the preceding embodiments, wherein a total binder is about 5% by weight to about 50% by weight of the cured fiber mat.

Embodiment 25

The fiber mat, the method, or the bituminous roofing product of any of the preceding embodiments, wherein the assembly of fibers is a non-woven mat.

Embodiment 26

The fiber mat, the method, or the bituminous roofing product of any of the preceding embodiments, wherein the fiber mat has a caliper at 1.8 pounds per 100 square feet of about 10 mil to about 40 mil.

Embodiment 27

The method of any of the preceding embodiments, wherein applying the first binder includes at least one application of the first binder on the unitary assembly of fibers.

Embodiment 28

The method of embodiment 27, further including substantially curing the first binder prior to a second application of a binder.

Embodiment 29

The fiber mat or method of any of the preceding embodiments, wherein the fiber mat is used as a reinforcement for a construction product.

Embodiment 30

The fiber mat or method of embodiment 29, wherein the construction product includes a bituminous roofing product.

Embodiment 31

The fiber mat or method of embodiment 30, wherein the bituminous roofing product includes a roofing shingle.

Embodiment 32

The bituminous roofing product of any of the preceding embodiments, wherein the asphalt substantially impregnates a plurality of interstices between the assembly of fibers.

Embodiment 33

The bituminous roofing product of any of the preceding embodiments, having a weight of about 175 pounds/100 square feet to 250 pounds/100 square feet.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

EXAMPLES

Example 1

Comparison Sample of a Homogenous Fiber Mat; i.e. an Unstructured Mat

The procedure for making a sample of a homogenous fiber mat includes dispersing a chopped glass fiber in water using an agitation blade. The fibers are 1.25 inches in length and 16 microns in diameter. Water is drained through a screen to form a glass mat. The mat is then saturated with a binder mixture of a urea formaldehyde, latex, and water (while still on the screen). The screen in pulled (carrying glass mat saturated in binder) over a vacuum slit to remove excess binder, achieving desired binder content as defined by LOI (loss on ignition). Loss on ignition test measures the % mass loss after burning off the binder→

$$LOI = \frac{\text{mass binder}}{\text{mass binder} + \text{mass glass}}.$$

The mat is cured in an oven for desired time and temperature to drive off water and cure the urea formaldehyde binder.

Figure 2:
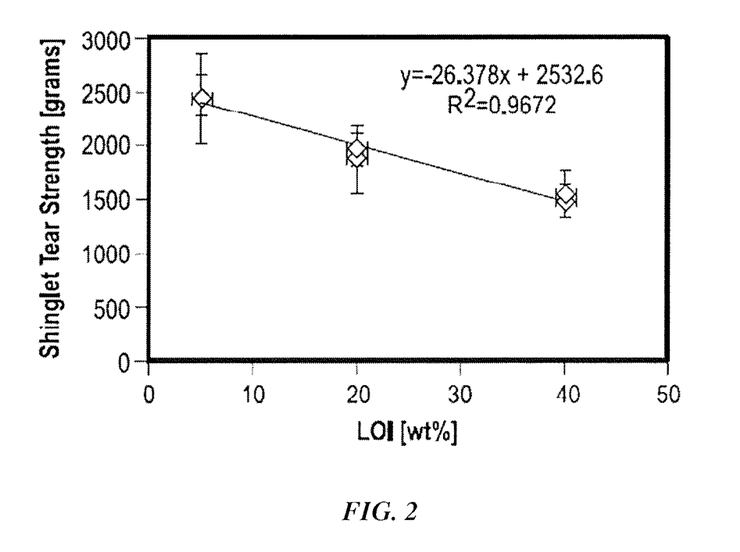
FIG. 2 includes a graphical depiction of tear strength for a shinglet containing a homogenous fiber mat with varying binder content.
Figure 3:
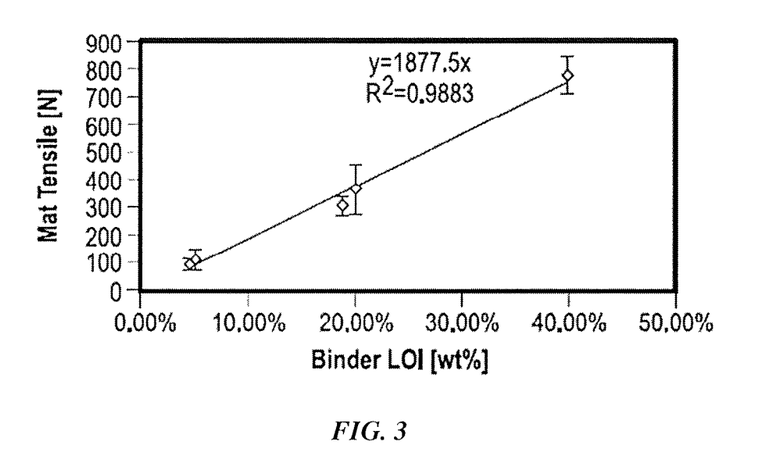
FIG. 3 includes a graphical depiction of tensile strength of a homogenous fiber mat with varying binder content. The tensile strength values are Newtons for a 3 inch wide strip.

Several different fiber mats and shinglets are made varying the binder content in the fiber mat while keeping the glass mass constant. As seen in FIG. 2, the shinglet tear strength increases as the binder amount decreases. As seen in FIG. 3, the lower the binder amount decreases, the mat tensile strength of the fiber mat decreases. As such, FIGS. 2 and 3 demonstrate how the properties of tear strength and tensile strength are typically coupled inversely with a homogenous mat structure.

Example 2

Exemplary Fiber Mat Having a Minority Portion and a Majority Portion, i.e. a Structured Mat An exemplary fiber mat of 5% LOI is produced using the steps of Example 1. A thin film of water+UF+latex formulation is coated onto a rigid substrate (glass plate) using a metering bar. The 5% LOI glass mat is pressed onto the coating/glass plate using consistent and even pressure. The glass mat is then peeled off of the plate (additional uncured binder will be retained on only one side of the mat). The mat is then cured in an oven for desired time and temperature to drive off water and cure urea formaldehyde.

Figure 4:
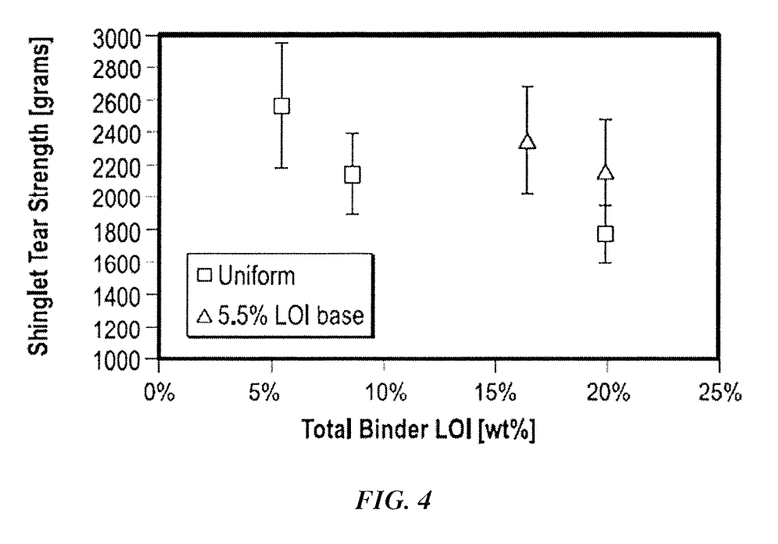
FIG. 4 includes a graphical depiction of tear strength for shinglets containing an exemplary structured fiber mat compared to shinglets containing a homogenous fiber mat, the shinglets varying in total binder LOI.

FIG. 4 shows that the binder on one side gives about 400 grams of an increase of tear strength with the total binder LOI at 20 wt %.

Figure 5:
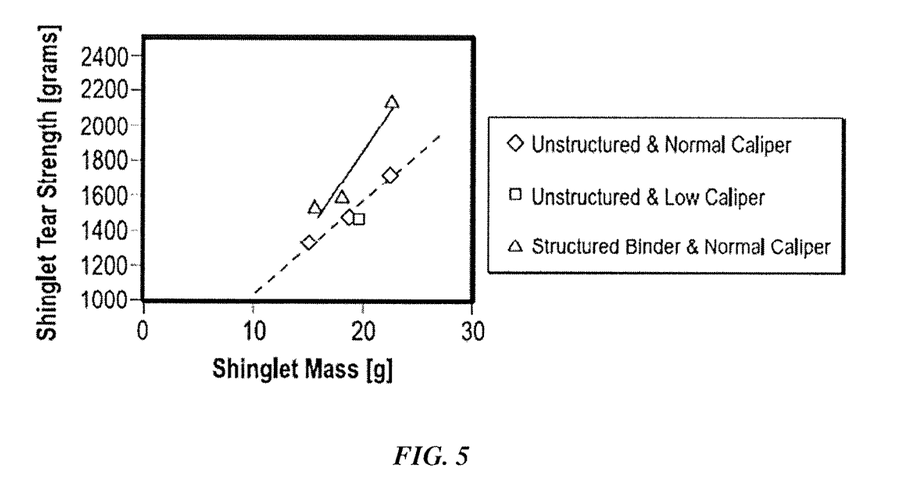
FIG. 5 includes a graphical depiction of tear strength for shinglets containing exemplary structured fiber mats compared to shinglets containing homogenous fiber mats, the shinglets varying in shinglet mass.

FIG. 5 shows that the caliper of the mat does not affect the tensile or tear of a shingle. As such, by forming a fiber mat with a minority portion that is different than a majority portion (i.e. a structured mat), the properties of tear strength and tensile strength can be selectively decoupled to tailor and achieve both desirable tear strength and tensile strength, particularly when the fiber mat is used in a bituminous roofing product.

Example 3

Exemplary Fiber Mat Made of PET/Glass Fibers

Chopped glass fiber and chopped PET fiber were dispersed together in water using agitation blade. The glass fibers are 1.25 inches in length and 16 microns in diameter. The PET fibers are 0.75 inches in length and vary in diameter (denier). They are blended in different mass ratios ranging from 10 wt % to 100 wt % PET fibers (on total weight of fibers, not including binder). Water is drained through screen to form glass mat. The mat is saturated with a mixture of urea formaldehyde, latex, and water (while still on screen). The screen is pulled (carrying glass mat saturated in binder) over a vacuum slit to remove excess binder, achieving desired binder content as defined by LOI (loss on ignition). The mat is cured in an oven for desired time and temperature to drive off water and cure urea formaldehyde.

Figure 6:
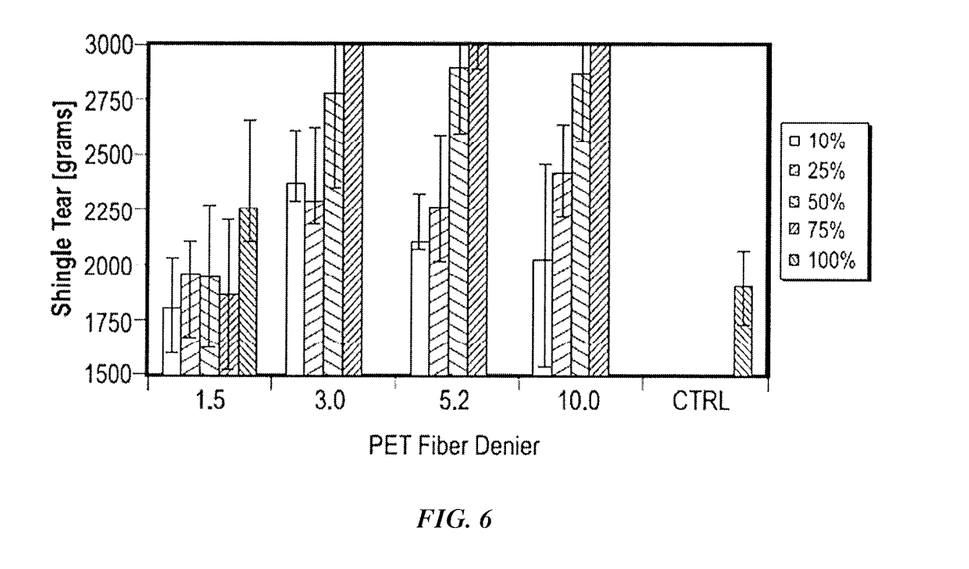
FIG. 6 includes a graphical depiction of tear strength for shinglets with fiber mats containing varying amounts of PET and glass fibers.

The results can be seen in FIG. 6 where the inclusion of PET dramatically improves tear of the shinglet. As such, it can be surmised that providing a minority portion having different fibers than the majority portion would achieve both desirable tear strength and tensile strength.

Example 4

Exemplary Process of Generating a Structured Binder with Spraying

An unstructured glass mat of 5% LOI is made using the method described in Example 1. A formulation is loaded into a sprayer, the formulation containing water+UF+latex. The formulation is sprayed onto one side of the glass mat until desired additional weight is achieved and the mat is cured in and oven for desired time to drive off the water and cure the urea formaldehyde binder.

Figure 7:
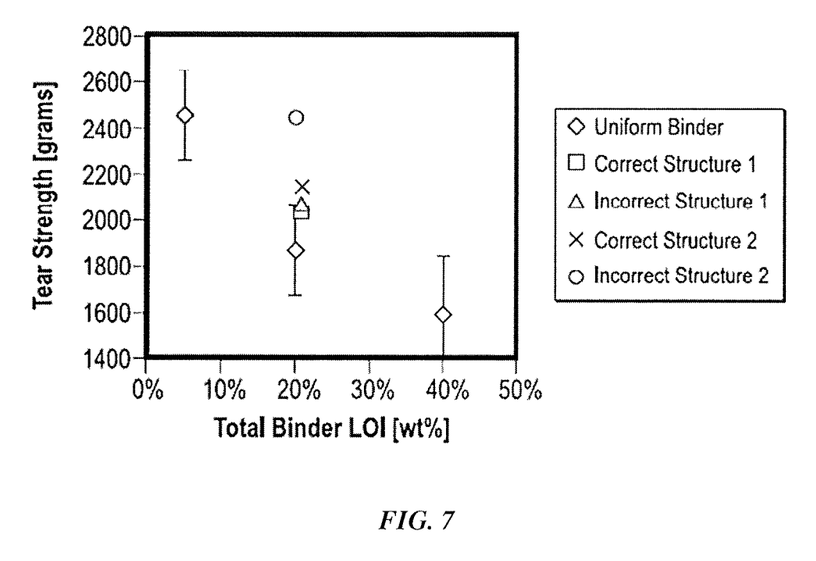
FIG. 7 includes a graphical depiction of tear strength for comparison shinglets with different methods of applying a binder to fiber mats at varying total binder LOI, yielding either structured or unstructured binder.
Figure 8:
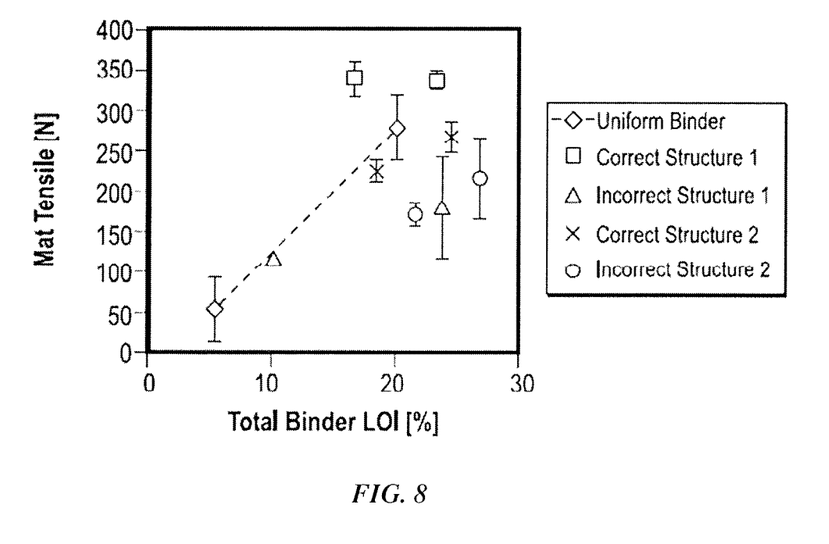
FIG. 8 includes a graphical depiction of mat tensile strength for comparison fiber mats with different methods of applying a binder to fiber mats at varying binder LOI, yielding either structured or unstructured binder. The tensile strength values are Newtons for a 3 inch wide strip.

Results can be seen in FIGS. 7 and 8 which show the tear strength of a shinglet and the mat tensile. As seen in FIG. 7, there is about 250-550 gram increase in tear strength. As seen in FIG. 8, a desirable mat tensile can be achieved via a structured binder at varying LOI.

Example 5

Exemplary Process for Coating a Glass Mat with Asphalt to Make a Shinglet (Used for all Shingle Tear Data on all Slides Mentioned).

A glass mat is stapled to a release liner substrate. Asphalt and filler are heated to 205° C. and mixed together. The asphalt is knife coated onto the glass mat. The asphalt is allowed to cool and then the partially coated glass mat is removed from a release liner. The partially coated glass mat is flipped over to expose the uncoated side and the mat is stapled down to the release liner substrate again. Fresh asphalt and filler is heated to 205° C. and mixed together. The asphalt is knife coated onto the partially coated glass mat to form fully coated glass mat (glass mat should be encapsulated in and impregnated with asphalt).

Shinglet tear is characterized using Elmendorf tear tester ASTM D1922.

Example 6

Figure 9:
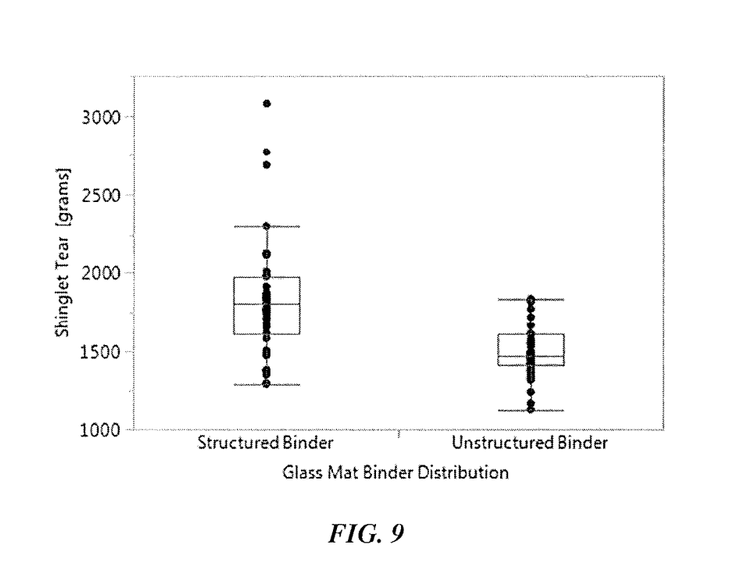
FIG. 9 includes a graphical depiction of tear of a shinglet with a glass mat with a structured binder and tear of a shinglet with a glass mat with an unstructured binder.

A structured binder glass mat is created by spraying binder on the top of a sheet as described in Example 4. An unstructured mat is formed using Example 1. Both sheets are 21% binder content and 79% glass content dry total weight. The weight of each sheet is 1.85 pounds per 100 square feet. The samples were coated with an equivalent amount of asphalt bringing the total weight of the asphalt covered glass mat to 10.5 pounds per 100 square feet. The structure binder shows a 318 increase in average tear, equating to a 21% increase in average tear in comparison to the unstructured binder. Tear results can be seen in FIG. 9.

The kinetic coefficient of friction of the structured glass mat is also compared to an unstructured glass mat. The kinetic coefficient of friction (COF) of two glass mats rubbed together (i.e. mat-to-mat kinetic COF) shows a strong correlation to surface binder content. For instance, more binder at the surface binds the fibers and lowers the COF. Additionally, the less binder allows for freedom of movement and entanglement of fiber and increases the COF. The testing protocol is ASTM D1894-14 for static and kinetic coefficient of friction.

Figure 10:
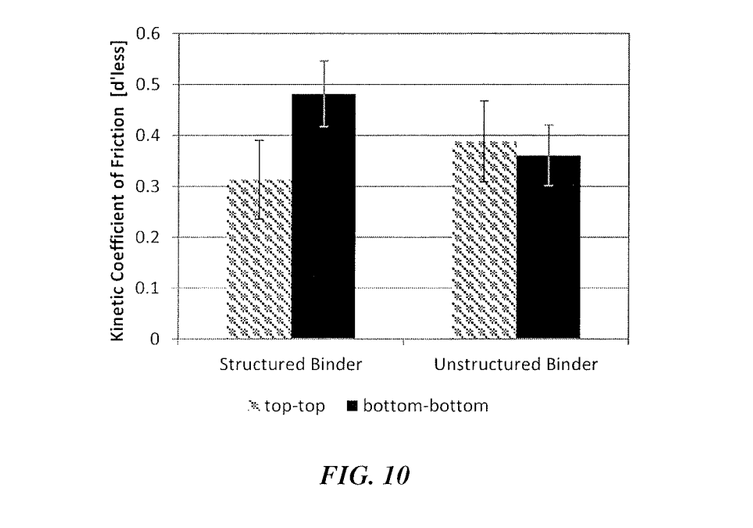
FIG. 10 includes a graphical depiction of kinetic coefficient of friction of bottom-bottom and top-top surface rubbing of a glass mat with a structured binder and a glass mat with an unstructured binder.

Results of rubbing the top surface of the glass mat to a top surface of the glass mat (the top-top) and bottom surface of the glass mat to the bottom surface of the glass mat (the bottom-bottom) can be seen in FIG. 10. As seen in FIG. 10, the structured glass mat has a higher amount of binder and lower COF on the top surface (where the binder is applied and the "minority portion") compared to the bottom surface (the "majority portion"). Clearly, the glass mat having the structured binder has a higher ratio of coefficient of friction of the bottom-bottom:top-top compared to the glass mat having the unstructured binder. For instance, the glass mat having the structured binder has a bottom-bottom COF greater than 0.35, such as greater than 0.40, or even greater than 0.45 with a ratio of bottom-bottom:top-top of greater than 1.25. In contrast, the glass mat having the unstructured binder has a bottom-bottom COF that is about 0.35 with a ratio of the bottom-bottom:top-top of less than 1.2, such as 0.8 to 1.2. A number of factors may have an effect on coefficient of friction such as, for example, fiber length, fiber diameter, fiber orientation, binder content, binder wetting onto glass, roughness of rollers used in processing, and dryer wire texture. However, when these factors are not varied when comparing a structured glass mat versus unstructured glass mat, FIG. 10 clearly demonstrates that a structured mat (with concentrated binder on the top surface) has a larger coefficient of friction difference and ratio between the bottom:bottom surface to the top:top surface of the structured mat compared to the unstructured mat.

Certain features, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A fiber mat comprises:
a unitary assembly of fibers comprising at least a first set of fibers homogenous throughout the fiber mat and a binder comprising an organic resin, wherein the binder comprises at least a first binder, at least a second binder, or combination thereof, wherein the unitary assembly of fibers comprises a difference in the binder in a minority portion and a majority portion, wherein the difference in the majority portion and the minority portion is in binder composition, binder concentration, or combination thereof, wherein the minority portion is less than 50% by weight of a total composition of the fiber mat and is a plane parallel to a plane of the majority portion of the unitary assembly of fibers and wherein the fiber mat provides at least a 5% increase in tear strength when placed in a bituminous roofing product compared to an equivalent bituminous roofing product made with a fiber mat of equivalent weight containing a homogenous mat structure.

2. The fiber mat of claim 1, wherein the minority portion has a higher tensile strength than a tensile strength of the majority portion.

3. The fiber mat of claim 1, wherein the majority portion, when placed in a bituminous roofing product, provides the increase in tear strength when compared to the minority portion.

4. The fiber mat of claim 1, wherein the minority portion is closer in distance to a top surface of the fiber mat compared to a bottom surface of the fiber mat.

5. The fiber mat of claim 4, wherein the fiber mat has an asymmetric flexibility.

6. The fiber mat of claim 1, wherein the minority portion is approximately equidistant from a top surface of the fiber mat and a bottom surface of the fiber mat.

7. The fiber mat of claim 1, wherein the minority portion comprises a higher concentration of the binder than the amount of a binder on the majority portion.

8. The fiber mat of claim 7, wherein a ratio of a coefficient of friction of a bottom-bottom to a top-top of the fiber mat is greater than 1.25.

9. The fiber mat of claim 1, wherein the organic resin comprises a urea-formaldehyde composition, a latex composition, a styrene-butadiene rubber (SBR) composition, a vinyl acetate ethylene composition, a blend or combination thereof.

10. The fiber mat of claim 1, wherein the fiber mat has a tensile strength at least 80% of a value of tensile strength of a fiber mat of equivalent weight containing a homogenous mat structure.

11. The fiber mat of claim 1, wherein the fiber mat has a tensile strength at least 80% of a value of tensile strength of a higher caliper fiber mat having a homogenous mat structure.

12. The fiber mat of claim 1, wherein a total binder is about 5% by weight to about 50% by weight of the fiber mat after the binder is cured.

13. The fiber mat of claim 1, wherein the assembly of fibers is a non-woven mat.

14. The fiber mat of claim 1, wherein the fiber mat has a caliper at 1.8 pounds per 100 square feet of about 10 mil to about 40 mil.

15. The fiber mat of claim 1, wherein the fiber mat is used as a reinforcement for a construction product.

16. A bituminous roofing product comprises a fiber mat comprising a unitary assembly of fibers comprising at least a first set of fibers; and at least a first binder comprising an organic resin, wherein the unitary assembly of fibers comprises a minority portion and a majority portion different than the minority portion, wherein the minority portion is less than 50% of a total composition of the fiber mat and is a plane parallel to a plane of the majority portion of the unitary assembly of fibers and wherein the fiber mat provides at least a 5% increase in tear strength when placed in a bituminous roofing product compared to an equivalent bituminous roofing product when made with a fiber mat of equivalent weight containing a homogenous mat structure; and
at least one coating of asphalt.

* * * * *

UNITED STATES PATENT AND TRADEMARK OFFICE
CERTIFICATE OF CORRECTION

| | |
|---|---|
| PATENT NO. | : 11,261,602 B2 |
| APPLICATION NO. | : 15/851365 |
| DATED | : March 1, 2022 |
| INVENTOR(S) | : Nancy E. Brown et al. |

It is certified that error appears in the above-identified patent and that said Letters Patent is hereby corrected as shown below:

On the Title Page

Item (73), delete "CRETAINTEED LLC" and insert --CERTAINTEED LLC--

In the Specification

In Column 17, Line 48-49, please delete "and a binder" and insert --and at least one binder--

In Column 17, Line 49-51, please delete "resin, wherein the binder comprises at least a first binder, at least a second binder, or combination thereof, wherein the unitary" and insert --resin, wherein the unitary--

In Column 17, Line 52, please delete "the binder" and insert --the at least one binder--

In Column 17, Line 55-56, please delete "composition, binder concentration, or" and insert --composition where the at least one binder comprises a first binder in the majority portion and a second binder in the minority portion; binder concentration wherein the at least one binder comprises the same binder in different concentrations in the majority portion and the minority portion; or--

In Column 18, Line 53, please delete "50% of" and insert --50% by weight of--

Signed and Sealed this
Twelfth Day of December, 2023

Katherine Kelly Vidal
*Director of the United States Patent and Trademark Office*